June 12, 1945.　　　C. W. MINTON　　　2,378,317
SEAMLESS KNITTED STOCKING
Filed Oct. 2, 1942　　　7 Sheets-Sheet 1

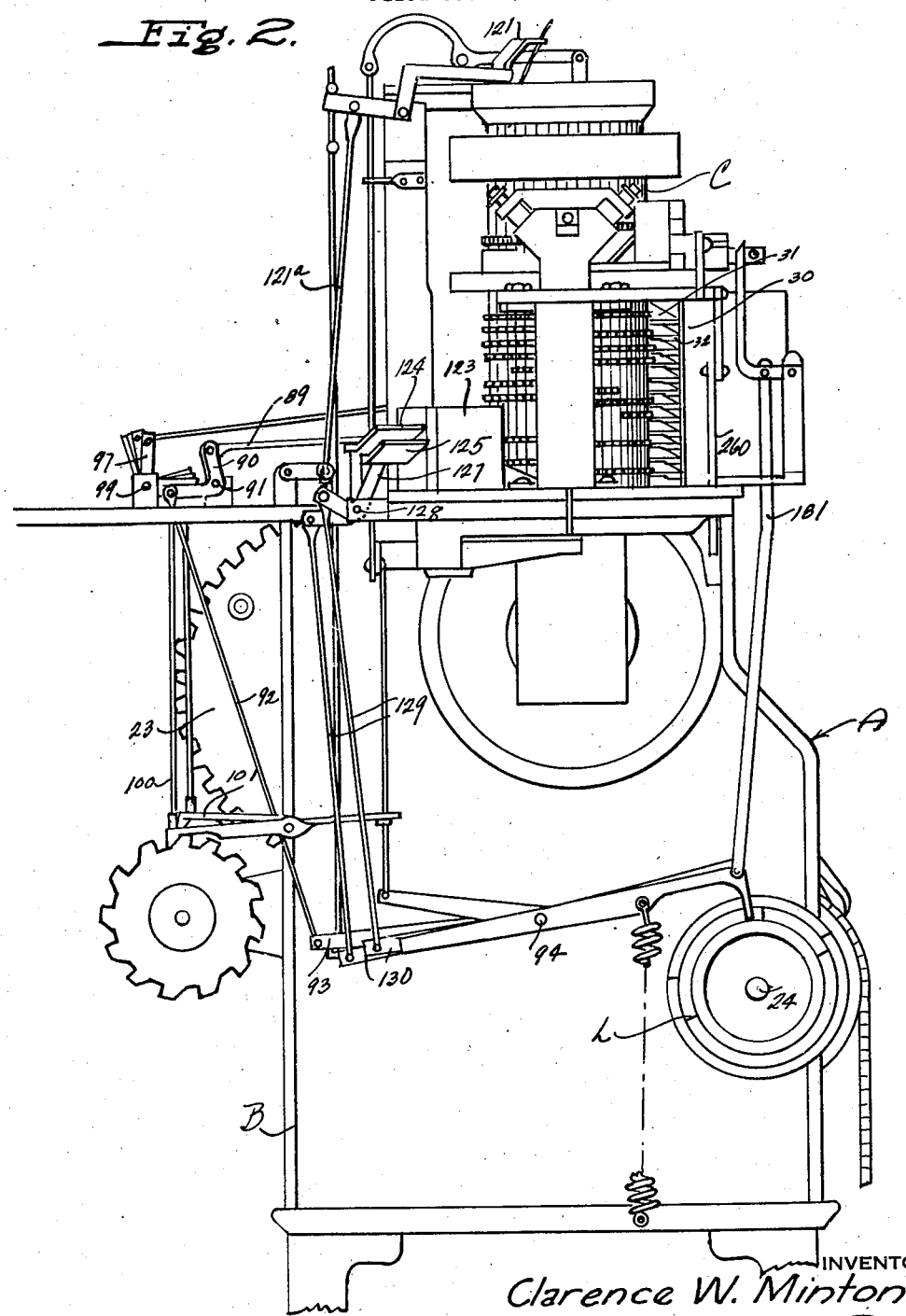

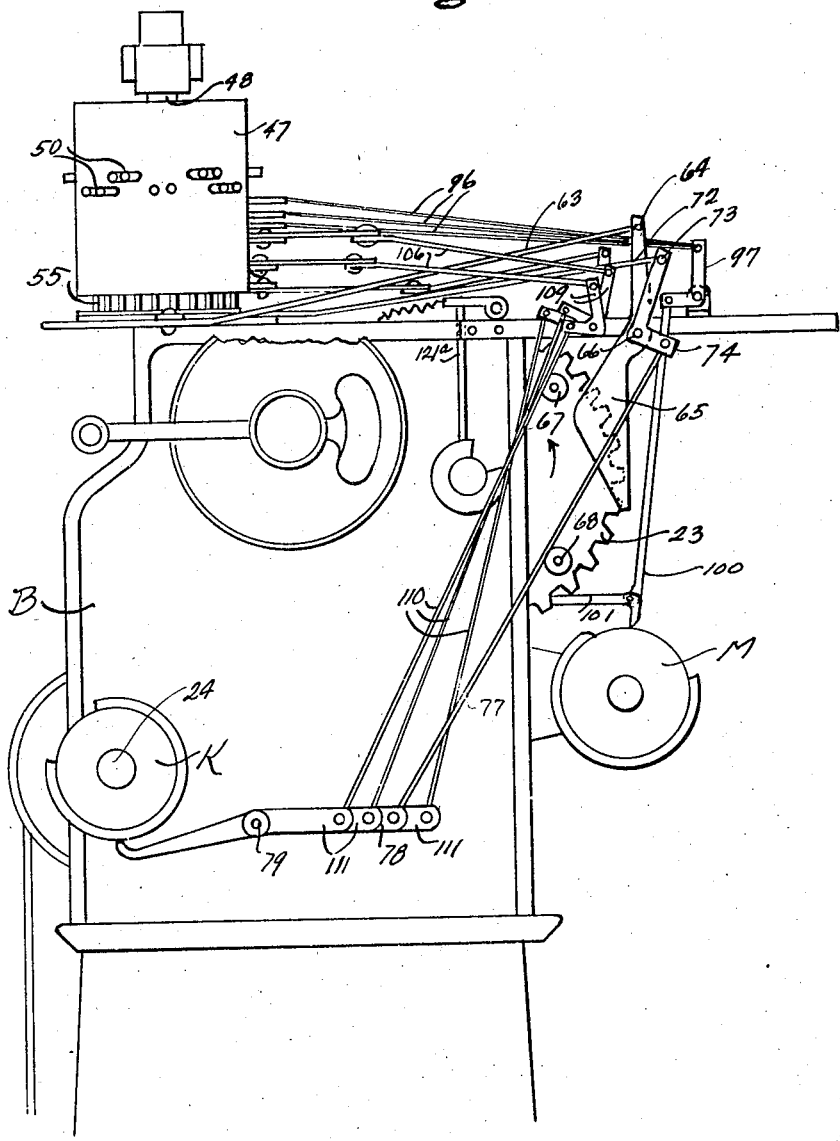

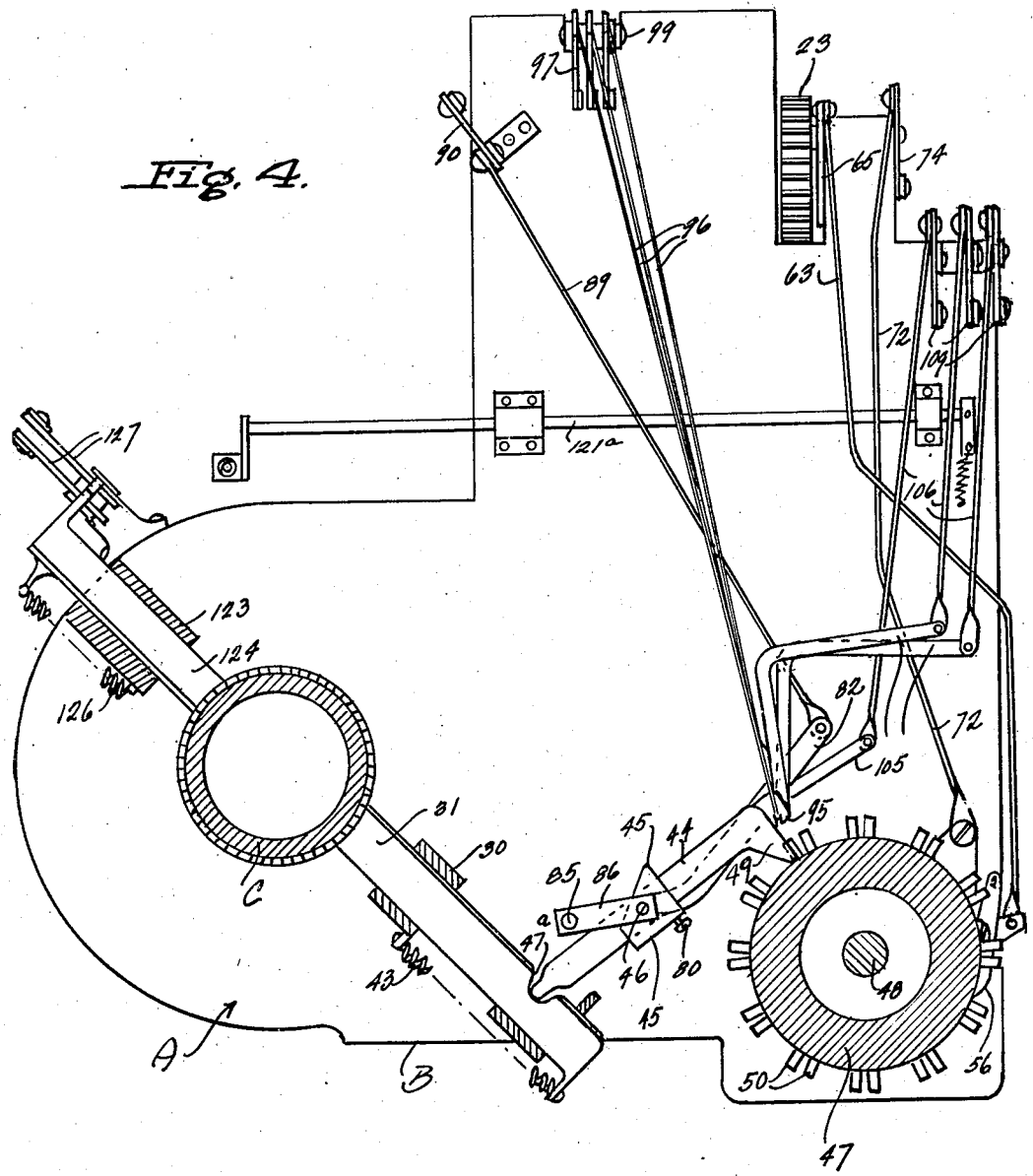

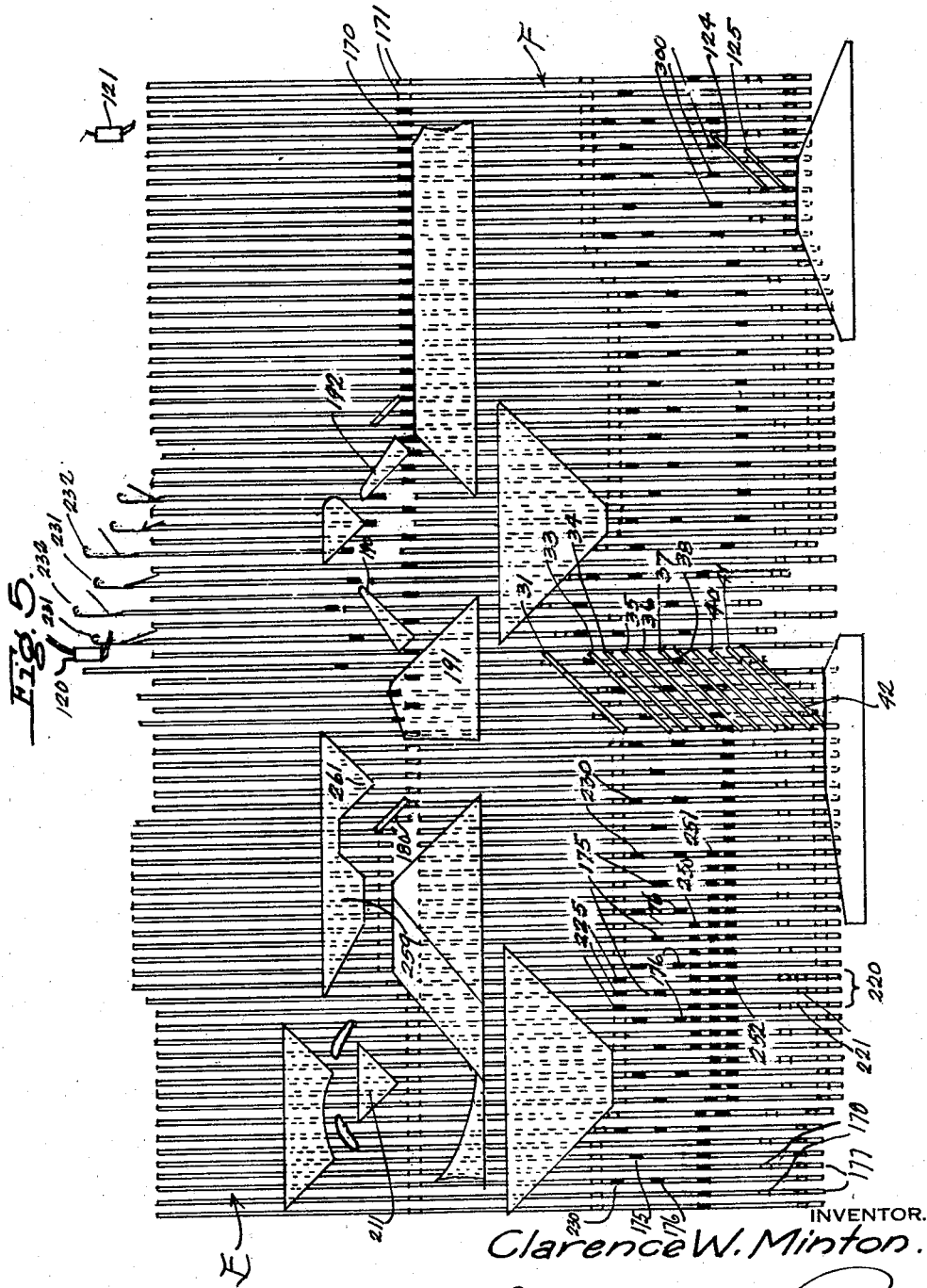

June 12, 1945.  C. W. MINTON  2,378,317
SEAMLESS KNITTED STOCKING
Filed Oct. 2, 1942  7 Sheets-Sheet 6
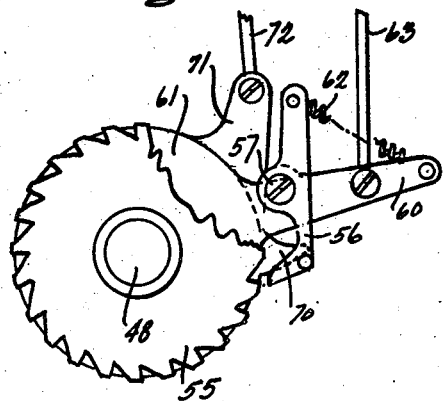
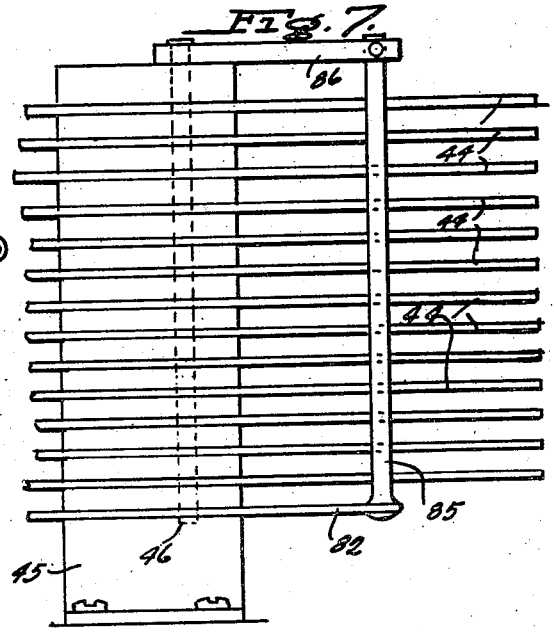
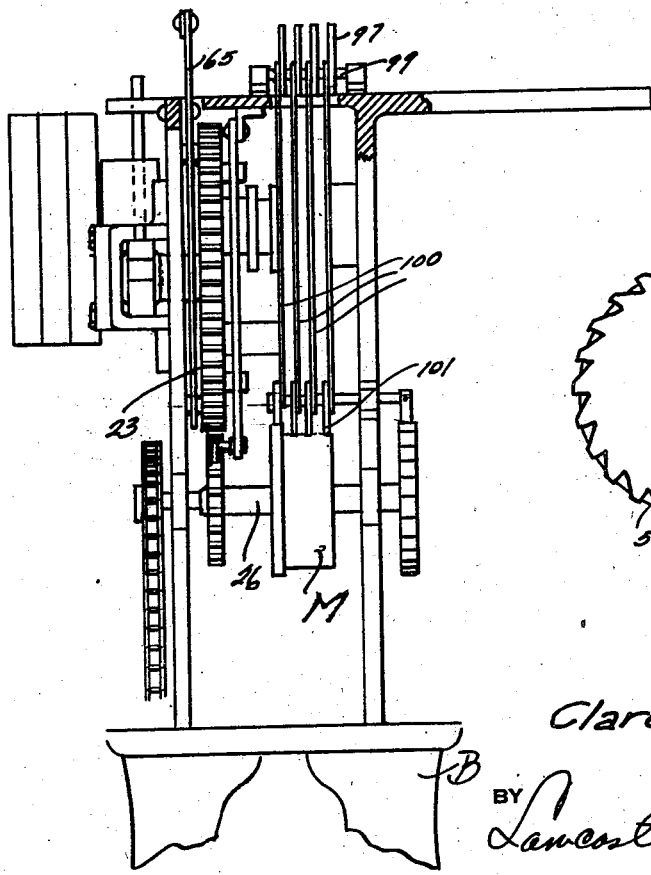
INVENTOR.
Clarence W. Minton.
BY
ATTORNEYS.

June 12, 1945.   C. W. MINTON   2,378,317
SEAMLESS KNITTED STOCKING
Filed Oct. 2, 1942   7 Sheets-Sheet 7
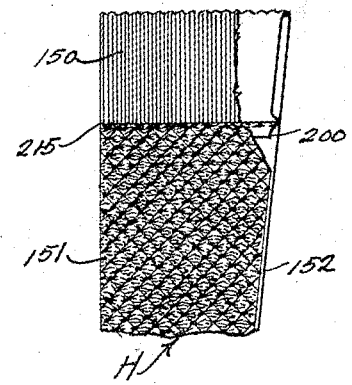
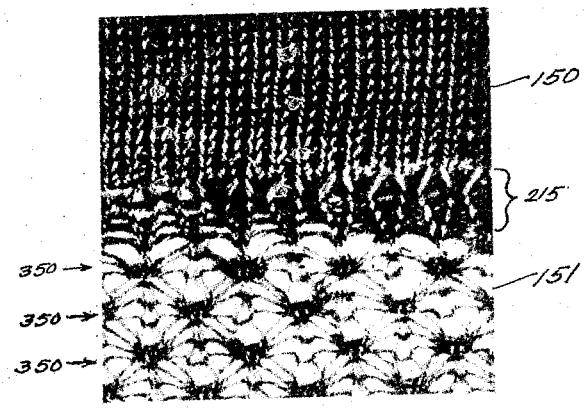
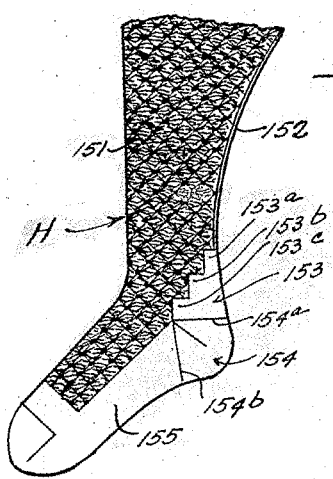
INVENTOR.
Clarence W. Minton.

Patented June 12, 1945

2,378,317

UNITED STATES PATENT OFFICE 2,378,317

SEAMLESS KNITTED STOCKING

Clarence W. Minton, Nashville, Tenn., assignor to Hold Stitch Fabric Machine Company, Nashville, Tenn., a corporation of Tennessee Application October 2, 1942, Serial No. 460,568

2 Claims. (Cl. 66—173)

This invention relates to a seamless knitted stocking and method of producing the same.

The primary object of this invention is the provision of a seamless knitted stocking having a mesh or open work type of leg of such nature that the stocking can be economically produced of cheaper grade yarn than silk and nylon.

Other objects and advantages of this invention will be apparent during the course of the following detailed description.

In the accompanying drawings, forming a part of this specification, and wherein similar reference characters designate corresponding parts thruout the several views.

Figure 2 is a left handed side elevation of the improved knitting machine.

Figure 3 is a fragmentary right handed side elevation of the improved knitting machine.

Figure 4 is a plan view, partly in section, of the improved knitting machine, showing the operating mechanism.

Figure 5 is a developed view of the needle and jack arrangement of the knitting machine.

Figure 6 is a fragmentary rear elevation of the knitting machine.

Figure 7 is an enlarged view of a jack actuating cam block mechanism.

Figure 8 shows the actuating mechanism for a jack plunger cam control drum.

Figure 9 shows a different position of the mechanism of Figure 8.

Figure 10 is a fragmentary view showing the hem and upper leg construction of a stocking knitted upon the improved machine.

Figure 11 is an enlarged view showing the welt and leg stitch arrangement of the improved stocking.

Figure 12 is a side elevation of the lever portion of the stocking.

Figure 1:
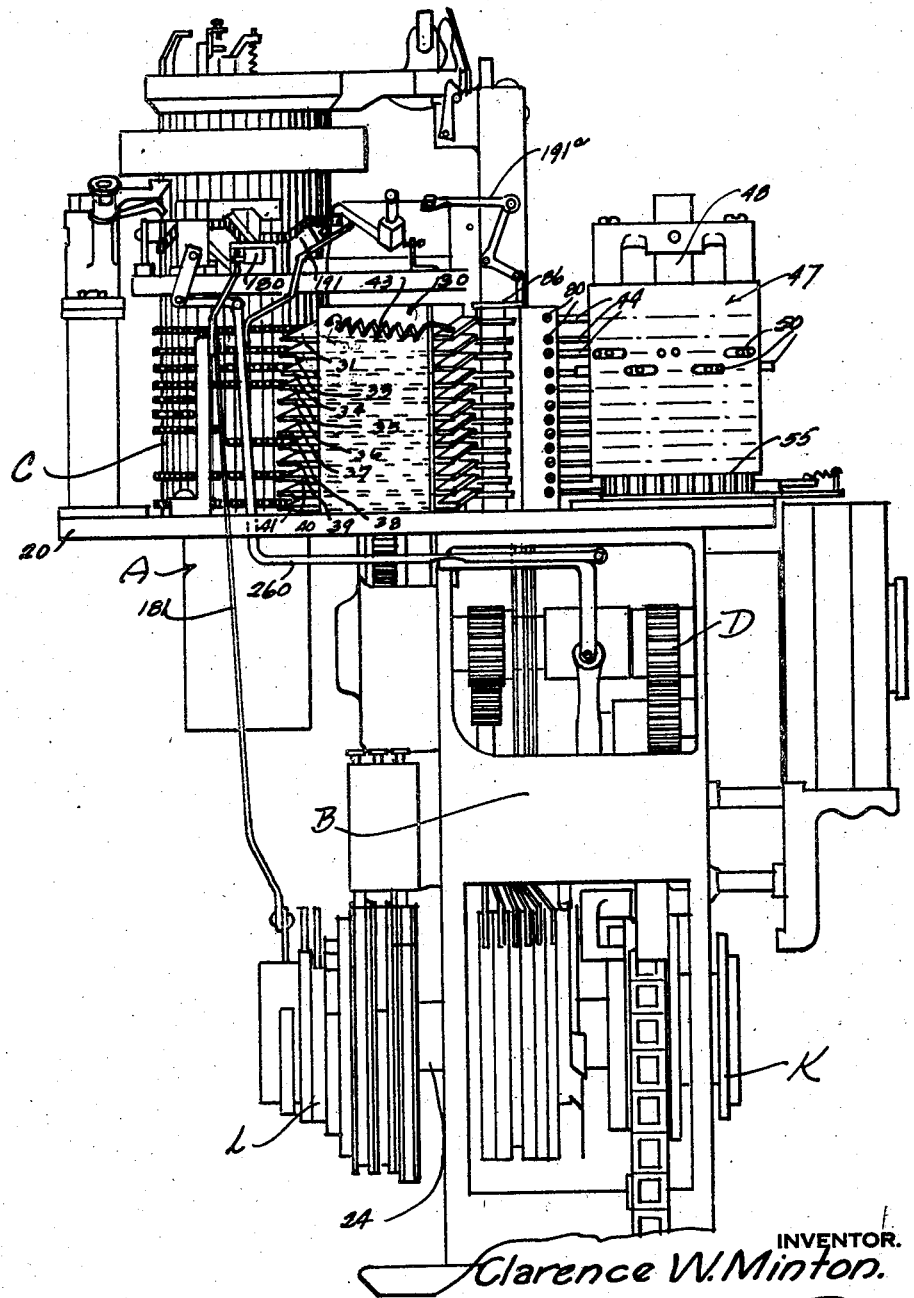
Figure 1 is a front elevation of the improved knitting machine.

In the drawings, wherein for the purpose of illustration is shown only a preferred embodiment of the invention, the letter A may generally designate the improved knitting machine which may include a frame structure B, cylinder C, means D to operate the cylinder; a set of needles E and a set of jacks F. An improved fabric H has been shown in Figures 10, 11 and 12 of the drawings, but it is to be understood that a wide variety of designs of fabric may be knitted upon the improved machine.

The knitting machine generally partakes of certain characteristics of the Banner type of knitting machine disclosed in U. S. Patent 933,443.

It is to be understood, however, that the features of this invention are applicable to any type of circular knitting machine.

The frame B has a supporting bed 20 upon which the cylinder C is rotatably mounted in well known manner. Means for rotating and oscillating the cylinder C are of any approved type and will not be described herein, other than to refer to them as the means D. This means D includes as one of the parts thereof a conventional "104" gear designated at 23 in Figure 2 of the drawings and elsewhere.

The machine furthermore includes a shaft 24 having right and left drums K and L thereon for controlling certain levers to be subsequently described. At the rear of the machine there is provided a conventional shaft 26 which has a horizontal striper drum M thereon for a purpose to be subsequently described.

Upon the bed 20 of the machine there is disposed a plunger cam block 30 having a plurality of plunger cams 31, 33, 34, 35, 36, 37, 38, 39, 40, 41, and 42 therein adapted to operate upon the butts of the set of jacks F, at different levels, for performing certain operations, to be subsequently described in detailing the cycle of operation of the improved machine.

The cams 31–42 are provided with individual springs 43 normally urging the cams inward into butt obstruction with the jacks. These plunger cams 31–42 are actuated by means of individual levers 44 pivoted upon a supporting post 45 by a shaft 46. This is shown in Figure 4 of the drawings, and there the levers 44 are shown as having reduced ends operating in sockets 47 of the individual plunger cams. The levers 44 are controlled off of an intermittently operated drum 47 rotatably mounted upon shaft 48. The levers 44 may be moved for withdrawing the plungers 31–42 against their normal spring action so that they will be out of the path of the jack butts. In Figure 4 it is shown that the levers 44 are provided with end extensions 49 adapted to be engaged by certain detachable projections or pins or other means 50 placed upon the drum 47 in a selected arrangement. It is to be noted that the drum 47 is provided with these pins in position to only operate two of the jack plunger cams. The drum may be provided with any suitable means, such as screw threaded openings for receiving the detachable lever operating studs or pins 50 in any position around the circumference thereof for each one of the cam plunger operating members 44.

The means for intermittent rotation of the drum 47 is shown in Figures 4, 8 and 9 of the drawings. This drum is provided with a ratchet 55 controlled by means of a pawl 56 pivoted at 57 upon a lever extension 60. The latter is mounted upon a disc 61 oscillatable upon the shaft 48 as an axis. A spring 62 normally holds the pawl in position to engage the teeth of the ratchet wheel 55, as shown in Figure 9 of the drawings. The extension 60 has a connecting rod 63 which is pivoted at 64, as shown in Figures 3 and 4 of the drawings upon the upper end of a lever 65. The latter is pivoted at 66 upon the frame of the machine and is in position to be operated by means of studs 67 and 68 positioned upon the "104" wheel 23. The studs 67 and 68, for this particular set-up, are positioned at 90° apart upon the wheel 23, so that the drum 47 is advanced two tooth notches of the pawl wheel for each full rotation of the "104" wheel 23. The "104" wheel rotates once for each four revolutions of the knitting machine cylinder, as is well known to those skilled in the art to which this invention relates.

The means for throwing the pawl 56 out of action consists of a cam extension 70 mounted upon a disc 71 freely rotatable upon the shaft of the drum. This disc 71 has a connecting rod 72, shown in Figures 3 and 4 of the drawings, pivoted at its rear end at 73 to a bell crank lever 74. The latter is pivoted upon the shaft 66 above described, and the bell crank lever is operated by means of a connecting rod 77 off of a lever 78. The latter is pivoted at 79 and operated by a cam arrangement upon the drum K.

As shown in Figures 1 and 4 of the drawings, screws 80 are provided on the post 45 on which the levers 44 are mounted, for each one of these levers, for the purpose of blocking out any of the individual cams 31–42.

In addition, means is provided for simultaneously throwing the entire set of cams in the block 30 out of action. This means consists of a lever 82 pivoted at the bottom of the post 45, upon the pin 46 having its forward end extending laterally of the levers 44 and there provided with a vertically disposed rod or member 85, shown best in Figures 4 and 7 of the drawings. The rod 85 is supported at its upper end upon a lever 86 pivoted upon the pin 46. Movement of the lever 82 will move the rod 85 against the forward ends of the levers 44 and by pressing thereagainst the cams 31–42 not already blocked out by the screws 80 can be thrown out of action. The lever 82 has a connecting rod 89, shown best in Figures 2 and 4 of the drawings pivoted rearwardly upon a bell crank lever 90. The latter is pivoted at 91 and its opposite end has a connecting rod 92 pivoted upon the rear end of a lever 93. The latter is mounted upon a shaft 94 and controlled off of the cam drum L, in a manner which is perfectly apparent. It is entirely possible to recess some of the levers 44 where the rod 85 operates thereagainst, so that certain of these levers 44 will not be affected by throwing out of the other levers thru operation of the lever 82.

It is contemplated that certain of the levers 44 need not be operated off of the drum 47. To that end certain of these levers 44 may have extensions 95, as shown in Figure 4 to which rods or wires 96 may be connected. The latter at their rear ends may be pivoted to certain bell crank levers 97. These bell crank levers may be mounted upon a block at an axis 99 and they are operated by means of rods 100 pivoted upon certain fingers 101, shown in Figures 2 and 4 of the drawings. These fingers or members 101 are operated off of the horizontal striper drum M above mentioned.

Certain others of the levers 44 are adapted to be operated off of the cam drum K at the right hand side of the machine. To that end, such levers 44 as are operated off of the drum K, may be provided with pivoted lever extensions 105. They have connecting rods 106, as shown in Figure 4 of the drawings, pivoted in turn to the upper ends of certain bell crank levers 109, shown best in Figure 3 of the drawings. The opposite ends of such bell crank levers 109 are connected by means of rods 110 with certain levers 111 pivoted on the shaft 79 and operating off of the drum K.

The knitting machine may be provided with a conventional main yarn feeding set-up and also an auxiliary yarn feeding set-up for the purpose of accomplishing different varieties of work. In the particular example of this application, the main feed knitting station may be provided with one or more yarn feed fingers 120, shown in Figure 5 of the drawings, and at the auxiliary feed station one or more yarn feed fingers 121 may be provided. This yarn feed finger 121 in the example of fabric shown in this application, is intended merely to supply yarn for the knitting of a mock seam in the stocking.

At the auxiliary feeding station of the knitting machine, as shown in Figures 2, 4 and 5 of the drawings, a cam plunger block 123 is provided, having plunger cams 124 and 125 slidably mounted therein and normally spring urged at 126, as shown in Figure 4 of the drawings, into butt actuating position with the jacks of the cylinder. Levers 127 are pivoted at 128 upon the machine and by means of rods 129 operated off of certain levers 130 pivoted on the pin 94, and operating off of the drum L above described.

While the machine of the present application has been shown as set up for the knitting of the type of fabric H shown in Figures 10, 11 and 12 of the drawings, it is to be understood that thru different cam and lever control, the machine may knit other types of fabric than that disclosed. Indeed such types of fabric have been shown and described in my co-pending applications Serial Number 416,746 filed October 27, 1941, and Serial Number 454,596, filed August 12, 1942. In the particular type of fabric H the leg is mesh knitted in a distinctive novel relation. This fabric H is a seamless knitted fabric having a welt portion 150, the wale lines of which are knitted upon every needle of the set E. The leg portion 151 is a tuck stitch mesh, and during the knitting thereof, alternate needles of the knitting machine are entirely inactive. The leg is provided with a mock seam 152, and the high splice 153, heel 154, sole 155 and remainder of the stocking are knitted in a relation to be subsequently described, upon all of the needles of the knitting machine.

In order to understand the complete cycle of operation of the knitting machine, it should be here mentioned that for the knitting of the mesh leg only alternate needles of the machine are operating. For one course in the knitting of the leg, all of these alternate needles receive yarn in order to knit stitches. For the next three courses, only half of these alternate needles (the alternate ones) receive yarn and knit the same into stitches, and the remaining needles (normally active during knitting of the leg), receive float portions of the yarn in the hooks thereof which are not cast off until stitches are knitted thereon in the fifth course, where again all of the needles which are active during the knitting of the leg are again placed in action for the knitting of yarn stitches. The procedure is then reversed for the next three courses and the leg knitting needles which previously received the float portions of the yarn are actuated to knit stitches and the remaining needles normally active during leg knitting receive the float portions of the yarn, which are cast off in the next course (after the knitting of three courses). This produces a diamond-shaped mesh design with coursewise offset tuck stitches in adjacent wales.

Referring now to the cycle of operation for the knitting of the fabric H.

The set of needles E are divided into a section thereof having long butts 170 and a section having short butts 171. The long butts are designated in full black in the developed view of Figure 5 and of course the needles are of the independent latch type.

The jacks are housed in the cylinder grooves, in conventional manner beneath the needles, and they have butts thereon at the different levels of the cams 31–42.

Not all of the cams 31–42 are used in this set-up and only those that are will be mentioned.

During knitting of the welt all of the needles of the set E are utilized for knitting yarn. The needles are elevated in advance of the yarn feed finger 120 by means of plunger cams 33, 34 and 40. In the line of the cam 33 every fourth jack of the entire jack set-up F is provided with a long butt 175. Between adjacent jacks having butts 175 there are three jacks, and the centermost of each of these three jacks has a butt 176 in the line of the cam 34. The other two jacks 177 each have a short butt 178 in the path of the plunger cam 40. Thus, when the cams 33, 34 and 40 are in position to engage the butts 175, 176 and 178, all of the jacks of the machine will be elevated to elevate all of the needles of the machine so that all of said needles will take yarn from the feed finger 120 in advance of the stitch cam. Thus, all of the needles of the machine are properly actuated by this cam arrangement to receive yarn for knitting the welt 150.

A hold stitch cam 180, shown in Figure 5 of the drawings, is slidably mounted upon a block on the frame of the machine and normally spring actuated into the path of the needle butts. This cam 180 is controlled thru leverage 181 off of the drum L, as shown in Figures 1 and 2 of the drawings.

During knitting of the welt this cam 180 is in position to engage the butts of the needles, and cams 190 and 191, which operate together off of conventional operating mechanism 191ᵃ are out of action. It is readily understandable that the cams 33, 34 and 40 will elevate all of the needles of the knitting machine to take yarn at the finger 120 and inasmuch as the cams 190 and 191 are out of action, there will be no interference in this operation during knitting of the welt. Stitches will be formed by reason of needle actuation of the stitch cam 192, which is operated in conventional manner.

The welt 150 may be of any length and folded over to provide a double web, as shown in Figure 10 of the drawings. At the end of the knitting of the welt, cams 33 and 34 are thrown out of action by reason of operation of the lever 82 off of the drum L in the manner above described. Ordinarily this would throw all of the levers 44 out of action, but one of these levers which controls the cam 40 has a cut-out portion (not shown) and is not affected by operation of the lever 82. This cam 40 remains in position to engage the butts 178 of the jacks 177. The stitches held on the needles controlled by the cams 33 and 34 are of course held on these needles while they are inoperative during the knitting of a welt lock extension 200, designated in Figure 10 of the drawings. This lock extension is knitted for twelve courses on every other needle of the set E, by reason of actuation off the cam 40. Of course, during this operation the hold stitch cam 180 is still in position to lower the needles for hold stitch purposes.

At the end of the twelfth course for the knitting of the lock extension 200, cam 40 is thrown out of action by reason of the actuation of this cam off of one of the levers 105—106—109—110—111; this leverage and linkage mechanism being of course operated off the drum K.

Cams 33 and 34 are now thrown into action thru release of the lever 82 operating off its linkage from the drum L. The plunger cam 124 is thrown into jack butt operating position as controlled off of the drum L. This cam 124 is now drawn into the path of the butts 178 on the jacks 177 so that the stitches hung on the hooks of the needles controlled by these jacks 177 will pass beneath the latches of the needles. The cam 211, shown in Figure 5 of the drawings, and which is stationary, will lower the needles subsequent to the cam 124 for casting off the stitches from the needles 177.

As above mentioned, cams 33 and 34 at the completion of the welt lock extension 200 are brought into action to elevate alternate needles of the knitting machine. The yarn is knitted for four courses on these alternate needles to produce the area designated at 215 in Figure 11 of the drawings, and at the end of the fourth course the cam 124 is withdrawn and cam 125 is drawn into action against the butts of three jacks designated at 220 in Figure 5 of the drawings. These three jacks at the area 220 are provided with butts 221 at a level in the path of the cam 125 and are elevated by this cam 125 to take yarn at the auxiliary feed station from the finger 121. This yarn knits a mock seam in the seamless stocking. The needles in this area 220 which take the mock seam yarn have their jacks provided with long butts 225 in the path of the plunger cam 31. At the same time that the cam 125 moves into action for the production of the mock seam, the cam 31 is thrown into action with the butts 225 for the purpose of elevating the three needles controlled by these jacks in the area 220, in order to cast the mock seam stitches produced by the yarn from finger 121 beneath the latches of these needles. This cam 31 is controlled by a lever 82 to regulate the degree of movement so that only the long butts 225 will be operated upon. Movement of this lever 82 will not interfere with operation of the cams 33 and 34 because the butts of the jacks which are in the path of the cams 33 and 34 are all long butts and the cams 33 and 34 are not sufficiently retracted to avoid these butts. These cams 125 and 31 remain in during the entire knitting of the leg to produce a mock seam in the leg of the stocking thruout the length thereof.

At this point cams 33 and 34 are alternately thrown into and out of action at every fourth course for the production of the mesh type knitted fabric on the alternate needles of the knitting machine which are active during normal knitting of the leg.

While the cams 33 and 34 are alternately in action to elevate every fourth jack and likewise elevate every fourth needle to receive yarn at the main feed station, from the yarn finger 120, it should be noted that each of these cams, so long as it is in action, also operates the other needles which are active during normal leg knitting; but only elevate them to a height where the yarn of the main feed station is taken by the latter needles without casting the stitch beneath the latches of said needles, so that the yarn is floated upon these needles for three courses and not cast off until there is a reversal in position of the cams 33 and 34. Thus, while the cam 33 is in position to operate on the butts 175 for elevating the jacks having said butts and the needles thereabove for producing stitches; this cam 33 at the same time will engage long butts 230 of the jacks which are normally controlled by the cam 34 for producing knitting, and will also elevate these jacks merely to the position shown by the needle at 231 in Figure 5 of the drawings, and these needles at this position 231 will not be elevated sufficiently to place the stitches held thereon, beneath the latches thereof, so that the yarn taken by such needles will be merely floated thereon. The cam 33 at the same time will elevate the needles controlled above the jacks having butts 175 for elevating those needles to the position shown at 232 in Figure 5 of the drawings, and in which position these needles will take new yarn and will also cast the previous stitches thereon beneath the latches. When cam 34 is thrown into action and cam 33 is withdrawn, the jacks having butts 176 will elevate every fourth needle to the height 232 and this same cam thru operation upon the butts 175 will elevate the remaining needles which are normally active during knitting of the leg to the position shown in 231 where the yarn is floated on the hooks thereof for three courses.

To further describe the sequence of operation with respect to operation of the drum 47, assuming pin 67 to have just moved the drum 47 thru operation of the linkage shown, plungers 33 and 34 will drop into action and raise alternate needles of the machine which are active during the knitting of the leg; these needles being designated as at 231 and 232 in Figure 5 of the drawings. Of course every other needle of the setup is elevated in this manner to the position shown by the needles 232 in Figure 5. The machine then turns one complete course and knits plain fabric. The pin 68 on the "104" wheel then moves the drum 47 permitting the plunger 33 to be pulled out of operation and leaving the plunger or cam 34 in position. The machine then turns three courses. During the knitting of these three courses the cam 34 is in action. The jacks having butts 176 will ride up on this cam 34 and elevate the needles 231 to the tucking position. Of course the jack butts 175 will also ride on the cam 34 to elevate the needles 232 to the knitting position. This is all in accordance with the description immediately above given, and during the knitting of these three courses the fabric is knitted plain on the needles 232 and tucked on the needles 231. By this time the "104" wheel has moved around so that the pin 67 again actuates the drum 47 and raises all of the alternate active needles during the knitting of the leg, represented by the needles 231 and 232 shown in Figure 5 of the drawings, to the knitting position and one complete course is plain knitted upon the fabric. The pin 68 of the "104" gear then moves the drum 47 and takes the cam 34 out of position and drops in the cam 33. The latter receives the butts 175 of the jacks to elevate the needles 232 to the tucking position shown in Figure 5, and the alternate jack butts 230 will also ride upon the cam 33 to elevate the needles 231 to the plain knitting position. Three courses are knitted with the cam 33 in active position and then the pin 67 again actuates both cams for knitting plain upon all of the needles 231 and 232. It is thus apparent that tucking takes place on every other needle of the set of needles which are active during knitting of the leg and that these tuck stitches are offset coursewise in adjacent wales, as shown in Figure 11 of the drawings.

Referring to the knitting of the heel of the stocking, it is preferred to provide a stepped high splice section 153.

Plunger cams 35, 36 and 37 control the knitting of the high splice stepped sections 153ª, 153ᵇ and 153ᶜ. The cam 35 operates on the jack butts 250 to elevate a section of the needles knitting this high splice stepped section 153ª. Similarly cams 36 and 37 operate on the jack butts 251 and 252 respectively for knitting of the high splice steps 153ᵇ and 153ᶜ respectively. These cams 35, 36 and 37 are operated by the means described off of the horizontal striper drum M. While knitting the high splice of the stocking, the cams 33 and 34 are of course alternating in the manner above described for knitting the front of the leg of the stocking at this point.

At the start of knitting of the heel at 154ª, the cams 35, 36 and 37 are withdrawn. The leveling cam 259 is operated off of leverage mechanism 260 shown in Figure 1 of the drawings to regulate all of the long butt needles of the machine. The tuck stitches of the long butt needles of the machine at the front of the stocking are of course held on these long butt needles during reciprocatory action for the knitting of the heel to the point 154ᵇ. For the knitting of the heel it is possible to use the same yarn as used for the knitting of the leg, but I prefer to provide another yarn which may be fed from another finger (not shown) at the regular feed station. The cams 190 and 191 were thrown into action at the same time that the knitting of the heel starts.

At the finish of the heel, the cam 259 is thrown into action to lower all of the long butt needles to the level of the point of this cam at 261. Those long butt needles which are inactive during knitting of the tuck or mesh leg should avoid taking the tucking yarn. To accomplish this, cam 38 is thrown into action. This cam will engage the long butts 300 of the jacks which are used during tuck knitting of the leg, in the long butt section of needles, and elevates these alternate long butt jacks for one half a course high above the needles which I wish to avoid taking the tucking yarn. At the same time, thru means which will be well understood by those skilled in the art to which this invention relates, the feed finger 120 is elevated a little higher than normal, so as to swing this yarn in a little farther than normally in order to place the yarn in the hooks of those needles which are elevated by the cam 38, and swing the yarn into a floated relation back of those needles which were lowered at point 261 but not elevated by cam 38. This cam 38 is operated off of the drum K thru one of the mechanisms 105—108—109—110—111 above described.

It should be mentioned that the only time the hold stitch cam 180 is out of action is during knitting of the heel and toe.

During knitting of the sole 155, the cams 35, 36 and 37 may be used to elevate the needles for knitting the sole on every needle the jacks of which are controlled by these cams, and the top of the foot is knitted as above described for producing mesh or tuck knitting.

The toe is knitted in conventional manner.

In Figure 11, in the courses designated by the arrows at 350, the yarn is knitted upon alternate needles of the knitting machine, but in these courses 350 every other needle of these alternate needles holds the yarn thereon for the knitting of the next three courses. The floats of the yarns caught in this stitch are clearly indicated by the black areas in the courses 350.

It is possible because of the establishment of main and auxiliary feed stations and cams for selectively elevating the jacks and needles at each of these stations to produce a stocking having walewise arranged floats which are relatively wide. This may be accomplished thru selective control of the jacks by the cam 124 so that said selected jacks will elevate selected needles to cast off the stitches from said needles and thus produce drop stitches. Thus, a fabric can be knitted in which the float portions between adjacent knitted wales are relatively wide by reason of the stitch having previously been formed upon the needles and then dropped.

It is of course understood that suitable binders and cutters may be provided for the yarns at each of the main and auxiliary feed stations.

Various changes in the set-up of the improved knitting machine of this invention may of course be made to produce various types of fabric, and the method of operating the machine and knitting the fabric may herein be departed from without departing from the spirit of the invention or the scope of the claims.

I claim:

1. In a seamless stocking the combination of a welt of plain knitted stitches of a predetermined number of wales, and a leg formed of an appreciably less number of wales than the welt and wherein certain wales are provided with tuck stitches each having float portions from a plurality of stitches of adjacent wales extended therethru, the adjacent wales of the leg having tuck stitches which are offset with respect to each other walewise.

2. In a seamless knitted stocking the combination of a welt of plain stitch knitting wherein adjacent wales have the stitches interknitted and wherein a predetermined number of wales are provided, a mesh type leg comprising wales of substantially half the number as the welt and wherein the respective wale lines comprise stitches having a plurality of float portions extending from adjacent wales in a tucking arrangement therein, the tuck stitches of adjacent wale lines being relatively offset walewise with respect to one another, and the individual wale lines each having plain knitted stitches between adjacent tuck stitches incorporated therein.

CLARENCE W. MINTON.